(No Model.)
T. J. THORP.
CLUTCH.
No. 521,059. Patented June 5, 1894.
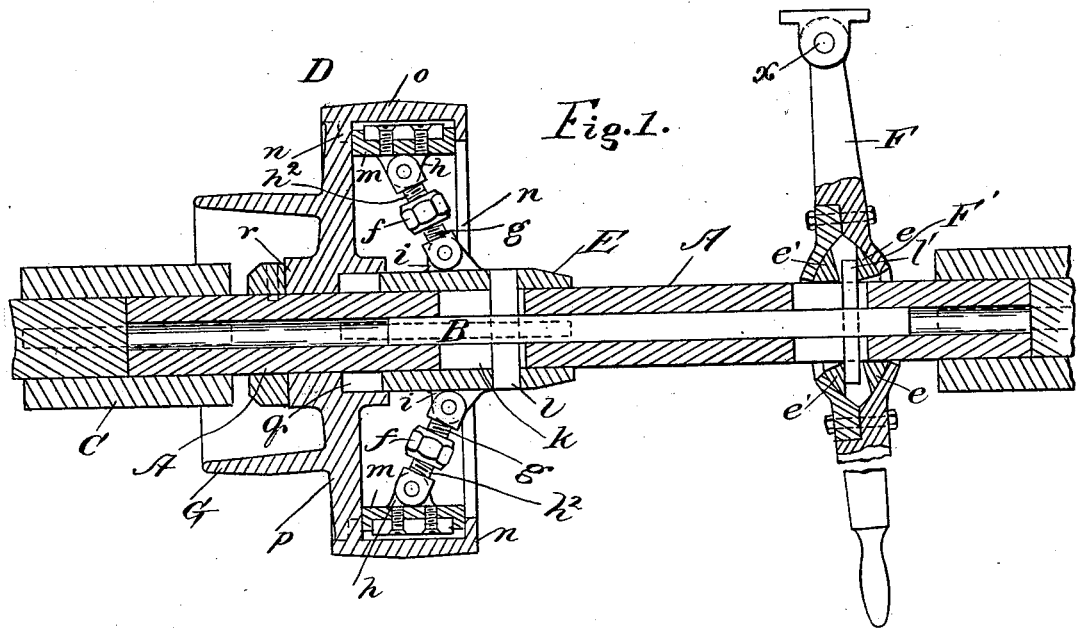
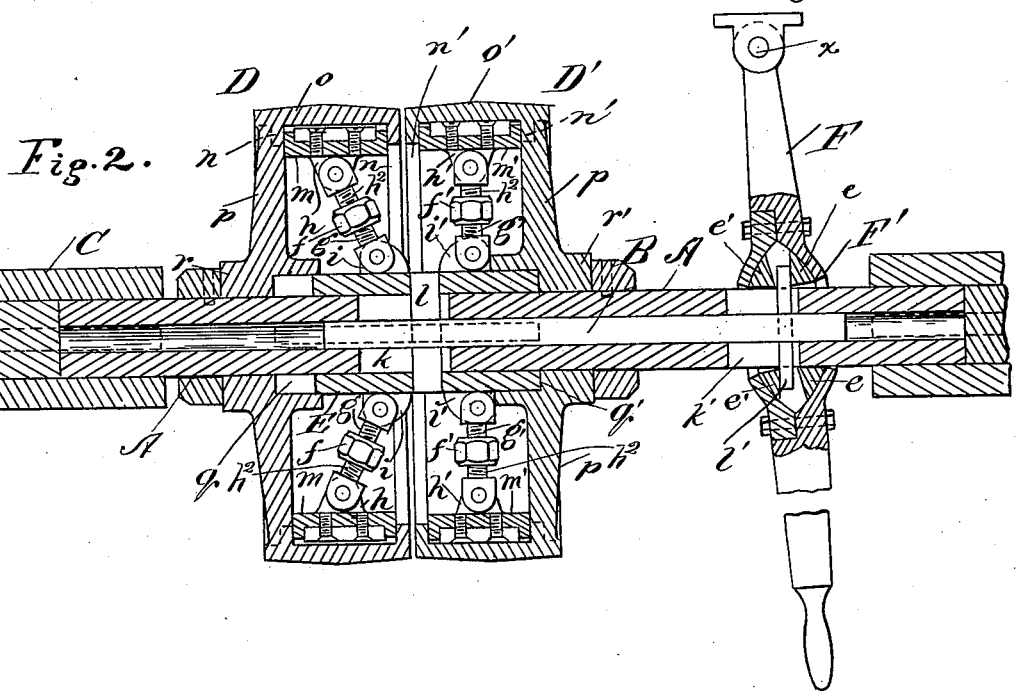
Witnesses:
Charles E. Burnap
Th. N. Williams
Inventor:
Thomas J. Thorp,
By Dyrenforth and Dyrenforth,
Att'ys.
THE NATIONAL LITHOGRAPHING COMPANY,
WASHINGTON, D. C.

UNITED STATES PATENT OFFICE.

THOMAS J. THORP, OF FOREST GROVE, OREGON.

CLUTCH.

SPECIFICATION forming part of Letters Patent No. 521,059, dated June 5, 1894.

Application filed September 12, 1893. Serial No. 485,336. (No model.)

*To all whom it may concern:*

Be it known that I, THOMAS J. THORP, a citizen of the United States, residing at Forest Grove, in the county of Washington and State of Oregon, have invented a new and useful Improvement in Clutches, of which the following is a specification.

My invention relates to an improvement in the medium at which to apply the driving-belt or gear for connection of such medium with the driving-power to transmit the latter to the machine to be driven.

My primary object is to provide a construction of the medium referred to which shall adapt it to be readily controlled to transmit the power at the will of the operator, without, to that end, requiring the shifting, or any adjustment, of the connecting-belt or gear-connection.

My further object is to adapt the medium referred to to be readily controlled to reverse, at will, the direction of operation of the transmitted power; and it is also my object to provide a power-transmitting mechanism affording an improvement in the art in the matter of construction and manner of operation.

In the accompanying drawings, Figure 1 shows my improvement by a view in longitudinal sectional elevation; and Fig. 2 is a similar view of my improved appliance in its amplified form for controlling the direction of operation of power transmitted through it as the medium.

A is a hollow rotary shaft in which is contained a guide-rod B adapted to be reciprocated longitudinally; and at C is indicated a well-known form of coupler for coupling together sections of the shaft.

D is an annular head comprising a hub $r$ loosely surrounding the shaft A and having an annular recess $q$ in one end about the shaft; spokes $p$ extend radially from the hub and carry at their outer ends an annular rim $o$, preferably of slightly V-shape in cross-section, and having lateral annular flanges $n$ depending from it, between which are loosely confined shoes $m$.

E is a supplemental reciprocating hub in the form of a hollow cylinder, and which fits at one end in the annular recess $q$ to supplement the hub $r$, and surrounds the shaft A, with which it rotates, being fastened thereto by means of a transverse key $l$ passing through the supplemental hub, and through the shaft at a longitudinal slot $k$ therein and also through the rod B. On the supplemental hub E are bearings $i$ pivotally supporting screws $g$; and on the shoes $m$ are bearings $h$ pivotally supporting screws $h^2$, the members of each pair of screws $g$ and $h^2$ being oppositely threaded and connected by a nut $f$ to form a turn-buckle. As will be understood, therefore, each shoe is connected with and controlled from the supplemental hub E by a turn-buckle, one of which is thus provided for each shoe, of which latter, there may be one or more, though it is preferred to provide the shoes in pairs the members of which are on opposite sides of the shaft.

F is the operating lever, fulcrumed at $x$ and connected between its fulcrum and handle with the shaft A. The preferred construction of the lever F is that shown, involving two longitudinal sections expanded where they surround the shaft to form, when the sections are fastened together, as represented, a housing F' containing two annular bearing-blocks $e$ and $e'$ which conform on their outer surfaces to the curvature of the inner walls of the housing F' and are approximately V-shaped in cross-section, being adapted to rotate with the shaft, about which they extend, by a key $l'$ passing transversely through the shaft in a slot $k'$ provided longitudinally therein, and through the rod B.

The operation is as follows: When the parts occupy the relative positions in which they are illustrated in Fig. 1, the annular head D is loose on the shaft A and therefore rotates about it when driven by a belt (not shown). When it is desired to fasten the driving-head D to the shaft to produce rotation of the latter the lever F is operated to force the rod B lengthwise in the direction which will slide the supplemental hub E into the recess $q$, whereby the turn-buckles (the construction of which renders them adjustable as to their length) are moved toward positions at right-angles to the shaft and, as a consequence, force the shoes $m$ against the peripheral rim $o$, thus binding the rotary head D to the shaft A through the medium of the supplemental hub E, the turn-buckles and the shoes. Obviously, by turning the lever F in the opposite direction, the shoes m will be withdrawn from engagement with the rim o and effect the release of the shaft from the rotating head D. The cone-pulley extension G, shown in Fig. 1, serves to permit adjustment of a belt to increase or decrease speed.

The described construction of the lever is especially serviceable for reciprocating the supplemental hub, for in being moved in either direction in the arc of a circle, as it necessarily is, its contained annular blocks e and e' will be moved, at opposite points of the shaft between them, in opposite directions, thereby, and owing to the shape of the annular blocks, causing them, respectively, to bear against the key l' at diagonally opposite points on the shaft, and thus greatly facilitating longitudinal movement of the rod B, by avoiding any binding.

As shown in Fig. 2 my improvement is adapted to effect, at the will of the operator, reversal of the direction of operation of the transmitted power. This is done by duplicating the rotating head on the shaft A, the one head D being placed, reversely to the companion-head D', on the supplemental hub E, fastened by the key l to the shaft as before described, the details of the head D' being counterparts of those forming the hub D and indicated by corresponding letters provided with prime-marks. According to this arrangement the belt for connecting one rotary head with the driving power must be presumed to be crossed, while the belt connection of the other is direct, or not crossed. Then, while one head is disengaged against rotation with the shaft the other may be tightened thereon to rotate with it; and both heads may be simultaneously out of engagement with the shaft to rotate loosely about it. The mechanism of both rotary heads is controlled through the medium of the lever F, which, as shown in Fig. 2, is at the extreme end of its right throw, in reaching which it has loosened the shoes of the head D and tightened those of the head D', thereby to cause the latter to rotate the shaft in one direction. By turning the lever to the extremity of its left throw, the head D' will, obviously, be disengaged from the shaft while the head D will be tightened thereon and rotate the shaft in the opposite direction, while if the lever be brought midway between the extremities of its two throws, and thus extend at right-angles with the shaft, the latter will not be rotated since both heads D and D' will be loosened upon it, and they will simultaneously be revolved, as idlers, in opposite directions on their hubs r and r'.

The single form of my improved appliance is especially adapted for driving a lathe or other machine in which no reversal of its motion is required; while the double form is intended for machines such as planers, wherein reversal of the motion is required.

What I claim as new, and desire to secure by Letters Patent, is—

1. In a power-transmitting appliance, the combination with a rotary shaft to be driven, of a rotary head having a hub confined against longitudinal movement on but loosely surrounding the shaft and provided with an annular recess in one end, an annular rim surrounding the hub, a shoe confined in said rim, a supplemental hub confined on the shaft to rotate with it but to permit longitudinal reciprocation thereon in said annular recess and a turn-buckle pivotally connected at its opposite ends, respectively, with the shoe and supplemental hub, substantially as and for the purpose set forth.

2. In a power-transmitting appliance, the combination with a hollow rotary shaft to be driven, of a reciprocable rod in the shaft, a rotary head having a hub confined against longitudinal movement on but loosely surrounding the shaft and provided with an annular recess in one end, an annular laterally flanged rim surrounding the hub, a shoe confined between the flanges in the rim, a supplemental hub keyed to the shaft and said rod to rotate with them but to permit longitudinal reciprocation of the supplemental hub and rod, a turn-buckle pivotally connected at its opposite ends, respectively, with the shoe and supplemental hub, and an operating lever connected with said rod, substantially as and for the purpose set forth.

3. In a power-transmitting appliance, the combination of a rotary-head normally confined loosely on a rotary hollow shaft and provided with an annular rim, a shoe confined on the rim, shiftable tightening means connecting the shoe with the shaft, a reciprocable rod in the shaft and keyed thereto to rotate with it and engaging said tightening means and a lever F having a housing F' at which it surrounds the shaft and containing the annular blocks e and e', and a key l' in the housing between said blocks and passing transversely through a slot k' in the shaft to engage the said rod therewith, substantially as described.

4. In a power-transmitting appliance, the combination with a rotary shaft to be driven, of a pair of rotary heads each having a hub confined against longitudinal movement on but loosely surrounding the shaft, each hub having an annular recess in its inner end an annular circumferential flanged rim and a shoe confined on the rim, a supplemental hub confined on the shaft to rotate with it but to permit longitudinal reciprocation thereon in said annular recess, and tightening means for each shoe, reversely arranged for the respective heads, and comprising a turn-buckle pivotally connected at its opposite ends, respectively, with the shoe and supplemental hub, substantially as and for the purpose set forth.

5. In a power-transmitting appliance, the combination with a hollow rotary shaft to be driven, of a reciprocable rod B in the shaft, rotary annular heads D and D' normally confined on the shaft loosely, shoes $m$ and $m'$ confined in the heads, a supplemental hub E keyed to the rod through the shaft to permit with the rod its longitudinal reciprocating movement, turn-buckles pivotally connecting the shoes with the supplemental hub and arranged, with relation to the respective heads, to assume differential positions, as described, in each by movement of the supplemental hub in either direction, and a lever F having a housing F' at which it surrounds the shaft and containing the annular blocks $e$ and $e'$, and a key $l'$ in the housing between said blocks and passing transversely through the rod B and through a slot $k'$ in the shaft, the whole being constructed and arranged to operate substantially as described.

THOMAS J. THORP.

In presence of—
M. J. FROST,
W. N. WILLIAMS.